United States Patent [19]

Golding et al.

[11] 3,858,240

[45] Dec. 31, 1974

[54] REDUCED RATE SAMPLING PROCESS IN PULSE CODE MODULATION OF ANALOG SIGNALS

[75] Inventors: Leonard S. Golding, Rockville; Ronald K. Garlow, Damascus, both of Md.

[73] Assignee: Communications Satellite Corporation, Washington, D.C.

[22] Filed: Sept. 14, 1972

[21] Appl. No.: 289,027

Related U.S. Application Data

[63] Continuation of Ser. No. 105,386, Jan. 11, 1971, abandoned.

[52] U.S. Cl. ............... 358/13, 333/28 R, 333/70 T, 358/31

[51] Int. Cl. ............... H04n 9/02

[58] Field of Search ......... 178/5.2 R, 5.4 R, DIG. 3, 178/DIG. 23; 333/73 R, 28 R, 6, 70 T

[56] References Cited

UNITED STATES PATENTS

| | | | |
|---|---|---|---|
| 2,729,698 | 1/1956 | Fredendall | 178/5.4 R |
| 3,546,372 | 12/1970 | Dischert et al. | 178/5.4 R |
| 3,647,943 | 3/1972 | Marshall | 178/5.2 R |
| 3,706,843 | 12/1972 | Laub | 178/DIG. 3 |
| 3,707,596 | 12/1972 | Kuhn | 178/5.4 P |

OTHER PUBLICATIONS

"A 15 to 25 MHZ Digital Television System For Transmission of Commercial Color Television," by L. Golding, U.S. Dept. of Commerce, National Technical Information Service, Access No. PB178993, Dec. 19, 1967.

*Primary Examiner*—Robert L. Griffin
*Assistant Examiner*—George G. Stellar
*Attorney, Agent, or Firm*—Sughrue, Rothwell, Mion, Zinn & MacPeak

[57] ABSTRACT

A composite color TV signal having the chrominance modulated and interleaved at the null points of the luminance frequency spectrum is comb filtered only over the region where the chrominance occurs. The filter separates luminance from chrominance. The chrominance is further demodulated and separated into its I and Q components. Each of the Y, I and Q components being a signal having a frequency spectrum with peaks at the horizontal line rate and nulls at an odd multiple of the horizontal line rate is sampled at a respective sampling frequency which is an odd multiple of half the line rate and which is also less than the Nyquist rate. Sampling at less than the Nyquist rate results in sampling energy being "folded back" into the spectrums of the respective Y, I and Q components; however, the sampling energy will be interleaved at the null points of the respective spectrums. When the sampled signals are received, the unwanted sampling energy is comb filtered out. All of the comb filters used comb only so much of the signal frequency band which includes the energy to be eliminated. Each comb filter includes a band pass filter which has a transfer characteristic which rises rapidly to a maximum level and remains constant over the frequency band of interest. The band pass filter includes phase equalization means which provides a linear phase shift versus frequency characteristic that intersects the ordinate of a phase shift versus frequency graph at a phase shift of $2n\pi$ where n may be any integer.

9 Claims, 13 Drawing Figures

REDUCED RATE SAMPLING PROCESS IN PULSE CODE MODULATION OF ANALOG SIGNALS

CROSS-REFERENCE TO RELATED APPLICATION

This application is a continuation application of our co-pending application Ser. No. 105,386, entitled "Reduced Rate Sampling Process in Pulse Code Modulation of Analog Signals," filed on Jan. 11, 1971 and abandoned on Sept. 14, 1972 in favor or the present application.

BACKGROUND OF THE INVENTION

The present invention is in the field of comb filters and more particularly is a comb filter for use in a digital transmission system adapted to transmit composite TV signals.

In systems which convert analog signals into digital quantities for transmission to distant receivers, it is conventional practice to sample the analog signal at periodic rates and convert each pulse amplitude sample into a digital quantity. The bandwidth of the transmitted signal is determined in part by the sampling rate which in turn is determined by the upper frequency of the signal of interest. Typically, the sampling takes place at the Nyquist rate 2W, where W is the upper frequency of the signal spectrum. As is well known, sampling at the Nyquist rate or above is necessary to prevent sampling energy from overlapping or being folded back into the desired spectrum.

It has been disclosed that some types of signals, e.g., TV signals, because of their spectrum characteristics, can be sampled at less than the Nyquist rate, thereby reducing transmission bandwidth. In such a system, sampling error is folded back into the spectrum of the desired signal, but again, due to the characteristic of the desired spectrum, the sampling energy can be filtered out without serious degradation of the desired signal. The characteristic of TV signals which allows sampling at lss than the Nyquist rate is the peaks and valleys of the signal spectrum which occur at multiples of the horizontal line rate and at odd multiples of one half the horizontal line rate, respectively. By setting the sampling frequency at an odd multiple of one half the horizontal line rate, the folded back sampling energy will fall within the null points of the desired spectrum. The sampling energy can then be filtered out by combing action at the null points of the desired spectrum.

Theoretically combing out the frequencies at the null points of the desired spectrum would have no effect on the desired spectrum. However, perfect comb filters are nonexistent and consequently some of the desired spectrum will be combed out. This is most serious at the lower frequencies of the desired signal band because that is where most of the signal information is concentrated.

It is also known in the prior art to comb filter a TV composite signal to separate out the luminance and chrominance components by effectively combing only over the band where the chrominance is interleaved with the luminance. However, the effective combing only over the band of interest will result in degradation of the signal. The prior art accomplishes effective combing in the following manner. First, the composite TV signal is combed over the entire band of the spectrum to separate the luminance from the chrominance. Two signals result, one being the combed luminance, the other being the combed out chrominance. The latter signal is then passed through a low pass filter having a cut off frequency where the chrominance begins, 2MHz. The low pass filtered signal is then added back in with the luminance to result in an overall comb filter which effectively combs only beginning at 2MHz. One of the defects of this system is that the lower portion of the output signal, the portion which is not intended to be degraded by combing action, is in fact combed. The adding of the two signals is not the same having an output signal with a lower frequency portion that was not combed at all. Secondly, the low pass filter will result in phase shifts causing the added signals to be improperly added and even subtracted at some frequencies. Additionally, the prior art contains no suggestion of intentionally interleaving sampling energy into the desired signal spectrum and combing only over the region where the sampling energy is folded back into the desired spectrum.

SUMMARY OF THE INVENTION

In accordance with the present invention, a composite TV signal is passed through a comb filter which combs only over the region where the chrominance is interleaved with the luminance. In the comb filter the signal is initially combed over the entire spectrum to obtain the chrominance energy. As previously explained, this spectrum will contain luminance energy which was unavoidably combed out of the total signal spectrum. The latter signal is then passed through a band pass filter and phase equalizer, which, inter alia, blocks the frequencies below 2 MHz, thereby resulting in an output therefrom which contains only the chrominance and minor portions of the luminance above 2 MHz. The latter signal spectrum is then subtracted from the original uncombed signal spectrum resulting in an output spectrum which has no combing below 2 MHz and therefore no combing degradation below 2 MHz where it would be the most serious. Since the envelope of the chrominance spectrum is not fixed but will vary with picture content it is not possible to have the band pass filter with a pass band characteristic that matches the chrominance envelope. It has been determined that the most suitable characteristic of the pass band is to rise rapidly at the frequency of interest to a maximum value and to remain constant over the frequency band of interest.

Additionally, in order to properly subtract the chrominance from the uncombed composite signal, it is imperative that like frequencies of the two signals be in phase. A delay line is inserted in the channel of the uncombed signal to compensate for inherent delay in the band pass filter. The delay line necessarily results in a linear phase shift versus frequency transfer characteristic. The phase shift characteristic of the delay line is matched in the chrominance channel by a phase equalizer, which imparts a matching phase shift versus frequency characteristic to the chrominance component.

The chrominance component is further applied to a demodulator which separates the I and Q components of the chrominance. Each of the components, I, Q and Y (luminance) is separately sampled at rates less than the respective Nyquist rates. Since the rates are chosen to be odd multiples of one half the horizontal line rate the folded back sampling energy will be interleaved with the desired spectrums, respectively. The samples are then converted into digital quantities and transmitted to a receiver where they are converted back into the analog components I, Q and Y, each having sampling energy interleaved therein.

Each analog component is then applied to a separate comb filter of the type described above. However, instead of combing over the band beginning at 2 MHz, as carried out at the transmitter, combing action takes place over the band where the sampling energy has been interleaved. The lower frequency portions of each of the analog components will be undisturbed by the combing action.

DETAILED DESCRIPTION OF THE DRAWINGS

Figures 1A, 1B:
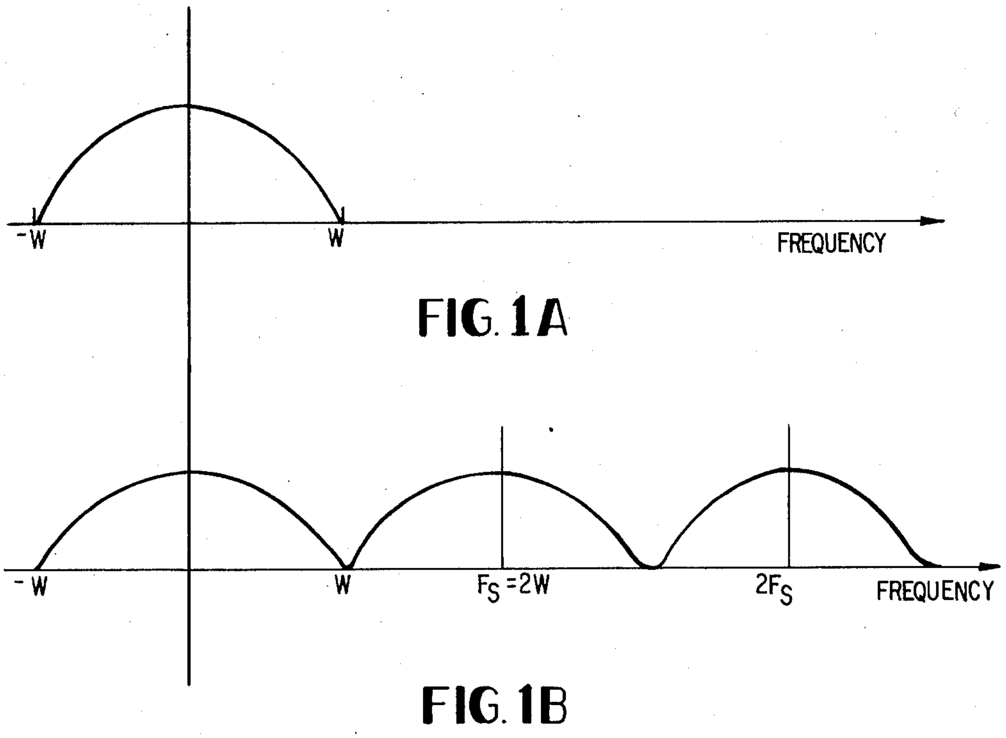
FIG. 1A illustrates an analog signal spectrum having a continuous spectrum from −W to W.
FIG. 1B illustrates the spectrum of the analog signal of FIG. 1A sampled at the Nyquist rate.

Referring to FIGS. 1A and 1B, if an analog waveform having a continuous spectrum over bandwidth W is sampled in time at intervals of $1/f_s$ where $f_s$ = sampling frequency, the sampled signal will have a frequency spectrum which contains the original spectrum plus a repetition of the original spectrum every $f_s$, as is well known in the art. If $f_s \geq 2W$ the frequency spectrum of the sampled pulses will not overlap the original spectrum, as illustrated in FIG. 1B, and the original waveform may be recovered at a receiver by proper filtering of the original waveform. However, if $f_s < 2W$ the spectrum of the sampled pulses will overlap within the original spectrum. This overlapping, due to sampling error, results in energy being placed within the band of the original spectrum. Filtering of the original spectrum over bandwidth W would not remove the overlapped sampling energy and therefore the reconstructed signal would contain sampling error.

Many analog signal spectra, e.g., NTSC color television signal and speech, have energy which extends over the frequency interval W, but within this interval have subintervals of relatively small energy levels. Under the system of the present invention, these analog signals are sampled at a rate less than the Nyquist rate in order to interleave sampling energy into the original analog spectrum. The rate is chosen whereby the sampling energy is interleaved at the sub-intervals having relatively small energy levels. At a receiver, only the sampling energy is attenuated thereby enabling the original spectrum to be reconstructed without significant degradation due to sampling error.

Figures 2A, 2B:
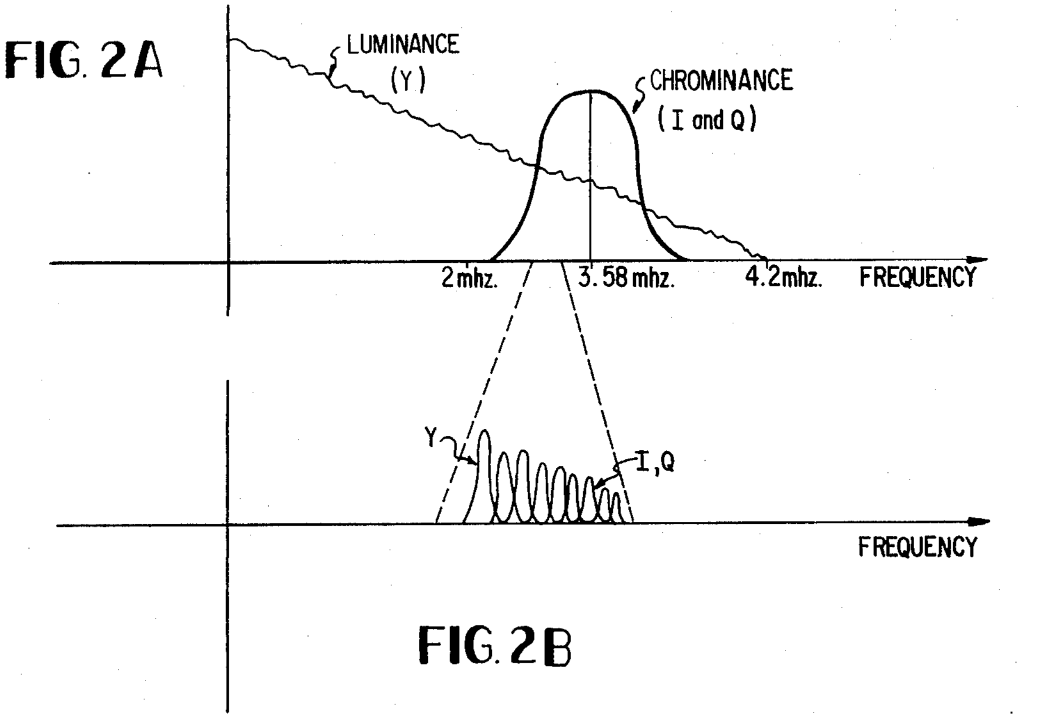
FIG. 2A illustrates the NTSC composite color television signal spectrum.
FIG. 2B illustrates detailed structure of the TV signal spectrum of FIG. 2A.

Referring to FIGS. 2A and 2B there is shown the frequency spectrum of the NTSC composite color television signal used throughout the United States and other countries for commercial broadcast television. The NTSC signal comprises three signals Y, I and Q. The Y signal is the luminance signal and has a bandwidth of 4.2 MHz. The I and Q signals carry the chrominance information and have, respectively, a bandwidth of 1.5 MHz and 0.5 MHz. As illustrated, the chrominance information is placed on a subcarrier at 3.58 MHz and transmitted with the luminance signal within the luminance bandwidth. FIG. 2B shows that there are concentrations of energy in the luminance signal. The concentrations of energy in the luminance signal occur at the line harmonics throughout the bandwidth of the luminance signal. In other words, the spectrum of the luminance signal is not continuous but contains energy, concentrated around the harmonics of the horizontal line rate (15.73 KHz), through the entire luminance bandwidth. The chrominance information is modulated on a sub-carrier at an odd multiple of half the line harmonic. The chrominance sub-carrier is chosen so that the chrominance sidebands occupy regions where there is little energy in the luminance signal, i.e., the sidebands lie midway between the line harmonics or at odd multiples of half the line frequency.

Figure 3:
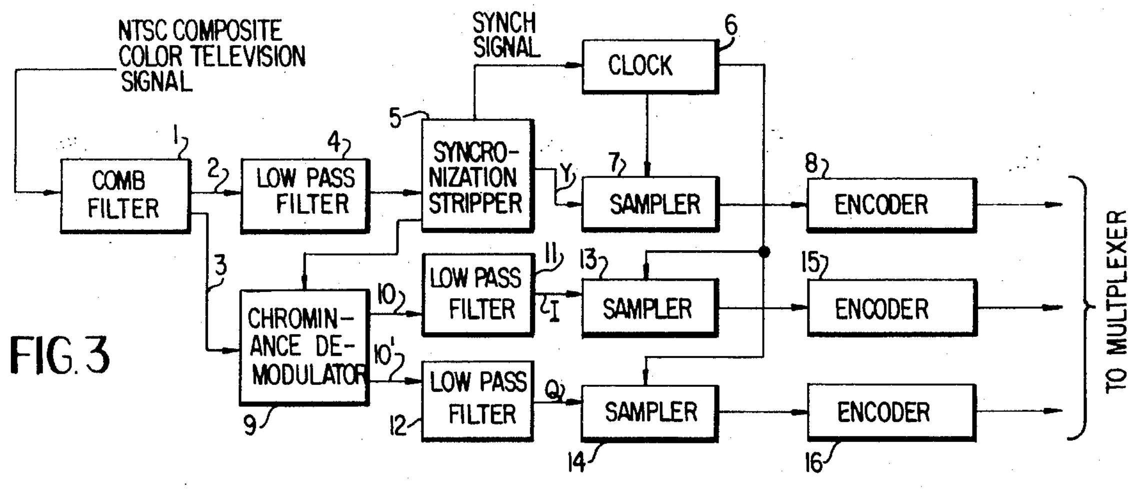
FIG. 3 is a block diagram of the implementation of the sampling technique for a color TV transmitter.
Figure 6A:
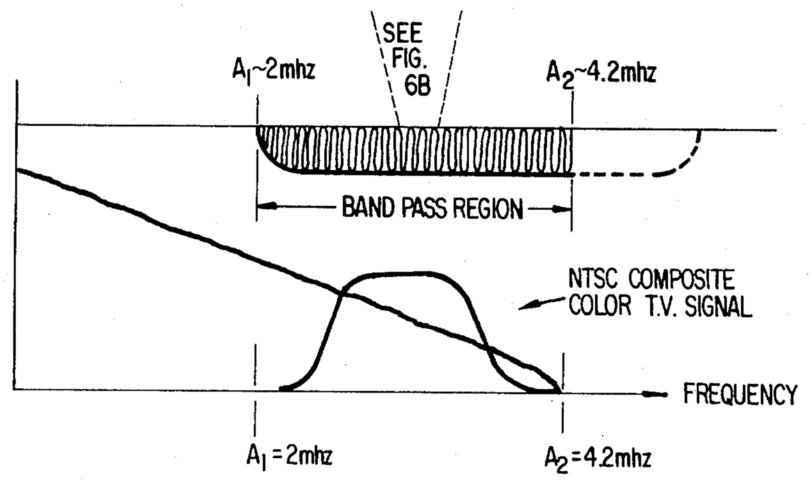
FIG. 6A shows the amplitude response of the comb filter of FIG. 5.
Figure 6B:
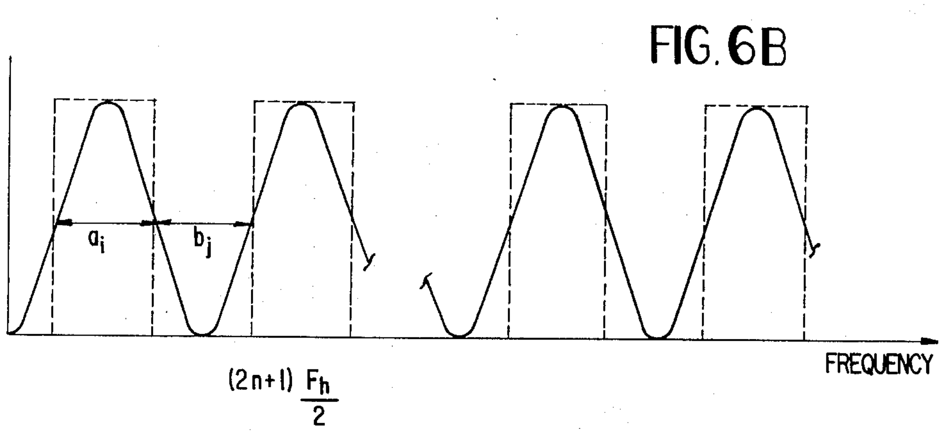
FIG. 6B illustrates the combing action required for the sampling technique as applied to color TV.

Referring to FIG. 3, there is shown a block diagram of the implementation of the sampling technique for a color TV transmitter. An NTSC composite color television signal is fed to comb filter 1 which provides two outputs at 2 and 3 comprising, respectively, the luminance information Y and the modulated chrominance information I, Q. Comb filter 1, hereinafter more fully described, has an amplitude response illustrated in the upper porion of FIG. 6A wherein $A_2$ = 4.2 MHz and $A_1$ = 2 MHz (which is approximately the frequency of the lowest chrominance sideband). FIG. 6B illustrates the detailed structure of the comb filter where $b_j$ is the stop-band interval, $a_1$ is the pass-band interval, $b_j = a_1$ and all stop-bands are equal to each other and all pass bands are equal to each other.

The luminance signal Y is then fed to low pass filter 4 which controls the overall shape of the spectral envelope by limiting the luminance spectrum to 4.2 MHz. By controlling the shape of the envelope of the original spectrum with low pass filter 4 the amount of sampling energy in the repeated spectrum that is folded back in due to a reduced sampling rate is controlled. The output of low pass filter 4 is then fed to synchronization stripper 5 which strips the synchronization information from the luminance signal and for reasons hereinafter discussed, provides sampling clock 6 with a synchronization signal so as to lock sampling clock 6 to the horizontal line frequency. The output of synchronization stripper 5 is then the pure liminance information Y. The luminance signal Y is then fed to sampler 7 which samples the analog luminance signal Y at a rate determined by sampling clock 6.

As noted previously, if an analog signal is sampled at a rate less than the Nyquist rate, sampling energy due to the repetition of the original spectrum will fall within the frequency interval of the original spectrum. Noting, once again, that the luminance signal Y is not continuous, but contains energy concentrated around the harmonics of the horizontal line rate, it is then possible to choose a sampling rate which would result in the interleaving of the sampling energy between the energy peaks of the Y signal; the Y signal being the signal desired to be reconstructed at a receiver. For proper interleaving of the sampling energy within the luminance signal Y, the sampling rate should be chosen at a frequency equal to an odd multiple of one half the horizontal line rate. Further, the sampling frequency is also chosen such that the sampling energy is not interleaved below the lower sideband of the chrominance information I and Q which has been filtered from the NTSC signal, i.e., down to ~2 MHz. The reason for this is to prevent any degradation of the luminance at the lower frequencies. As will appear more fully hereafter, a comb filter at the receiver combs over the band where sampling energy is interleaved but does not comb over the remaining lower portion of the band. Since the transmitter comb filter leaves frequencies below 2 MHz uncombed, it is desirable for those lower frequencies to remain uncombed at the receiver. For these reasons, the sampling frequency $f_s$ used to sample the non-continuous luminance spectrum Y having a bandwidth $W = 4.2$ MHz is $f_s \sim 1.5\ W \sim 6.002$ mega samples per second. (Referring to FIG. 1B and noting that if $f_s = 1.5\ W$ then $f_s - W = 1.5W - W = 0.5\ W \sim 2$ MHz.) The sampled analog luminance signal is then fed to an encoder 8 which digitally encodes the samples into a digital pulse train for subsequent transmission to the receiver of FIG. 4.

The modulated chrominance signals I and Q on line 3 of FIG. 3 are fed to a chrominance demodulator 9, well known in the art, to produce the chrominance outputs I and Q on lines 10 and 10', respectively. The outputs I and Q of chrominance demodulator 9 now have concentrations of energy located at harmonics of the horizontal line frequency and have bandwidths of ~1.5 MHz and ~0.5 MHz, respectively. The I and Q signals are fed, respectively, to low pass filters 11 and 12 which perform the same function as low pass filter 4, that is, control the shape of the respective spectral envelope such that the output of low pass filter 11 will be the I signal at a bandwidth of 1.5 MHz and the output of low pass filter 12 will be the Q signal at bandwidth of 0.5 MHz. These signalss are then respectively fed to samplers 13 and 14. The spectra of the chrominance signals I and Q also are not continuous, but contain energy, as noted previously, concentrated at the harmonics of the horizontal line rate. Therefore, in order to properly interleave the sampling energy when sampling at a rate less than the Nyquist rate, the sampling frequencies for the I and Q signals are chosen to be at a rate equal to an odd multiple of one-half the horizontal line rate; e.g., 2.556 and 0.747 megasamples per second, respectively. The sampling frequencies are provided by sampling clock 6. The I and Q samples are then fed to encoders 15 and 16 which quantize the samples into digital pulses. The Y, I and Q signals are time division multiplexed and then modulate a carrier for transmission to the receiver of FIG. 4.

Figure 4:
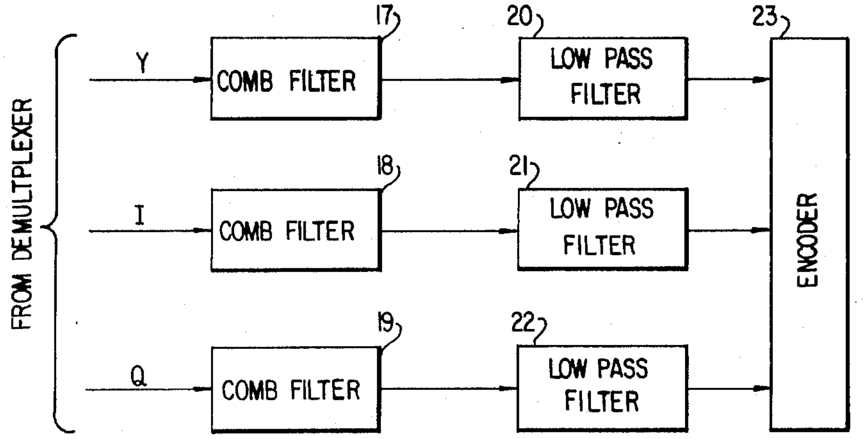
FIG. 4 is a block diagram of the implementation of the sampling technique for a color TV receiver.

Referring to FIG. 4, there is shown a block diagram of the implementation of the sampling technique for a color TV receiver. After demodulation and demultiplexing, the train of digital pulses is converted, in the usual manner, to analog waveforms representing the Y, I and Q signals but having sampling energy interleaved therein. The Y, I and Q analog signals are then fed, respectively, to comb filters 17, 18, 19 of a type similar to comb filter 1. Each comb filter 17, 18, 19 has an amplitude response shown in the upper portion of FIG. 6A such that the interleaved sampling energy which appears at odd multiples of one half the horizontal line frequency will be attenuated. Although the comb filters 17, 18 and 19 are of the same general construction as that of comb filter 1, their pass bands and combing bands cover different frequency ranges. These bands can be described generally as follows, assuming W is the bandwidth of the signal spectrum and $f_s$ is the sampling frequency. The comb filter has a pass band up to frequency $f_s - W$. The latter frequency is where the folded in sampling energy begins. The comb filter has a combing band from $f_s - W$ up to at least W with the band having peaks at multiples of the horizontal line rate and valleys at odd multiples of one half the horizontal line rate. As will be apparent, the values of W and $f_s$ differ for I, Q and Y. The values of W are determined by the composite signal and cannot be selected by the designer. However, the values of $f_s$ can be selected. Competing factors exist in selecting $f_s$. On the one hand, the smaller $f_s$ is made, the lower the bandwidth needed to transmit the digital signal. On the other hand, a small $f_s$ means that the sampling energy will be folded over a larger portion of the entire band of the signal spectrum. Since most of the signal information occurs at the lower frequencies of the signal bandwidth, and since combing causes the signal band will not have sampling energy interleaved therein.

The outputs of comb filters 17, 18, 19 will be respectively the Y, I and Q signals having no appreciable degradation due to sampling error. The signals are then respectively fed to low pass filters 20, 21, 22 which remove the sampling energy outside the original signal band. The Y, I and Q signals are then fed to an NTSC encoder 23 well known in the art to recover the NTSC composite color signal.

Figure 5:
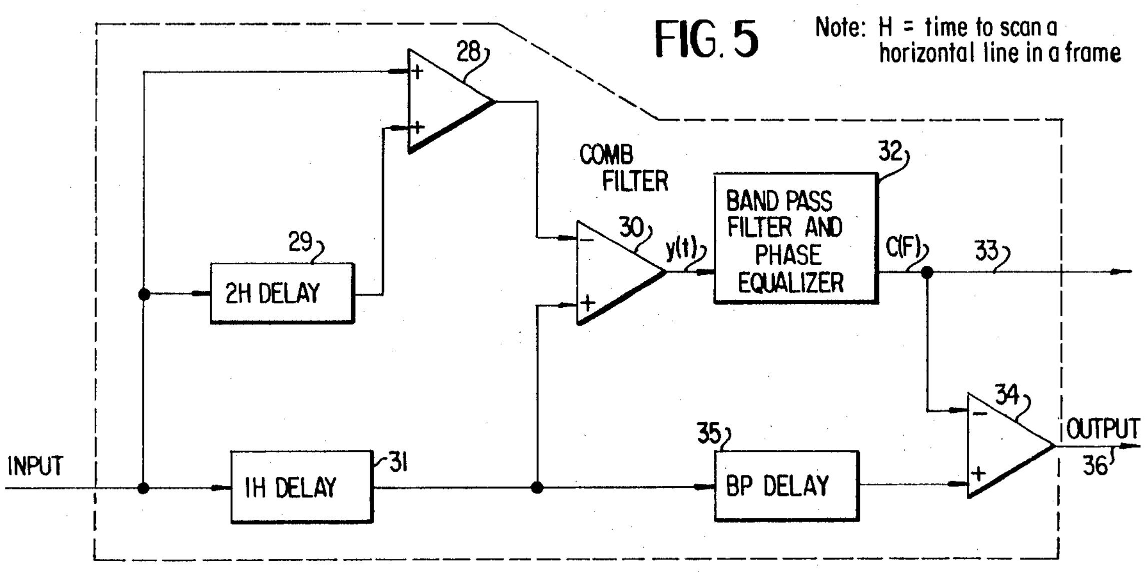
FIG. 5 is a block diagram of a specific comb filter for the color TV application.

An implementation of comb filters 1, 17, 18, 19 of the subject invention is shown in the block diagram of FIG. 5, and will now be described. The initial description is based on the assumption that FIG. 5 is the implementation of comb filter 1 of FIG. 3. The NTSC composite signal is fed undelayed to summing amplifier 28 and delayed two horizontal lines via delay 29 to amplifier 28. The output of summing amplifier 28 is then fed as one input to subtracting amplifier 30. The second input to subtracting amplifier 30 is the NTSC composite signal delayed one horizontal line via delay 31. Assuming that $T$ = time to scan one line and that $V(t)$ = the output of the NTSC composite signal delayed one horizontal line, then $V(t + T)$ = the undelayed signal $V(t - T)$ = the NTSC signal delayed by two horizontal lines.

The output $y(t)$ of subtracting amplifier 30 will be:

$$(1)\quad y(t) = V(t) - [V(t + T) + V(t - T)]/2$$

The number 2 in the fraction is obtained simply by having a voltage divider at the upper input to terminal 30.

The frequency spectrum of $y(t)$ can be seen by taking the fourier transform of $Y(t)$ which yields.

$$y(f) = V(f) - [V(f)e^{j\omega T} + V(f)e^{-j\omega T}]/2$$

$$y(f) = V(f)[1 - (e^{j\omega T} + e^{-j\omega T})/2\ ]$$

$y(f) = V(f)[1 - (\cos wT + j \sin wT + \cos wT - j \sin wT)/2]$ (2) $y(f) = V(f)\,(1 - \cos wT) = V(f)\,(1 - \cos 2\,\pi fT)$.

As can be seen from equation (2), the output spectrum is the original signal spectrum multiplied by $(1 - \cos 2\,\pi fT)$. The spectrum thus has peaks at odd multiples of the horizontal line rate, $(1/T)$, and nulls at integral multiples of the horizontal line rate.

Thus at the output of amplifier 30, the composite signal will have been combed over the entire spectrum to result only in the chrominance and a small portion of the luminance. The small amount of luminance is due to the fact that (1) the comb is not perfect and (2) there is some overlap of chrominance and luminance frequencies.

If the output of amplifier 30 were then simply subtracted from the uncombed composite signal to obtain the luminance, the resulting "combed" luminance would be slightly degraded below 2 MHz due to the subtraction of the small portion of the luminance appearing in the output of amplifier 30. There is also some degradation at freqencies above 2 MHz but it turns out to be insignificant.

In order to eliminate degradation of the luminance below 2 MHz, where combing is unnecessary and undesirable, the output from amplifier 30 is first band pass filtered before being subtracted from the uncombed composite signal. The band pass filter and phase equalizer is selected to block all frequencies below 2 MHz and to pass all frequencies from 2 MHz up to at leastt 4.2 MHz. It will be noted that the band pass characteristics of filter 32 above 4.2 MHz are unimportant because the low pass filter at the output of the comb filter will block all frequencies above 4.2 MHz. See filter 4 in FIG. 3.

Since the output of the band pass filter 32 is subtracted from the uncombed signal to comb out the chrominance or sampling energy, as the case may be, it is desirable that the chrominance envelope in the bandpass output be identical to the envelope of the chrominance component in the uncombed composite signal. For example, if the peak at any frequency in the bandpass output is too large, it will result in unwanted elimination of a portion of the luminance at adjacent frequencies. If the peak is too low, it will not comb out all of the chrominance from the composite signal. It has been determined that degradation caused by the former case is less severe than degradation caused by the latter case. Further, it is realized that the chrominance or sampling energy envelope, as the case may be, is not constant but will vary with picture content. Consequently, it has been determined that the optimum band pass characteristic is one which rises rapidly at the start of the pass band to a maximum value and remains maximum over the entire band of interest. The maximum is set to allow complete combing where the chrominance or sampling energy is greatest.

Another reason for selecting the band pass filter to have a substantially constant amplitude response over the band of interest is related to the phase shift problem. All filters will have a phase shift characteristic, i.e., frequencies are phase shifted as they pass through the filter. Additionally, the band pass filter will impart an inherent delay to the signals passing therethrough. In order to compensate for the inherent delay in the output from band pass filter 32, a delay line 35 is provided to delay the uncombed composite signal prior to subtraction in subtraction means 34. The delay line will necessarily also cause phase shifts in the composite signal. The phase shift characteristic of a delay line is linear and passes through zero, i.e., a curve of phase shift plotted on the $y$-axis versus frequency plotted on the $x$-axis, will be a straight line which passes through the intersection of the $x$ and $y$ axes. This is obvious because a d.c. signal (0 frequency) will have zero phase shift.

In order for subtraction in means 34 to properly comb out the chrominance or sampling energy it is necessary that the bandpass filter 32 provide a phase shift transfer characteristic which matches that of a delay line. It will be appreciated that matching of characteristics does not mean that a given frequency has to be phase shifted the identical amount; it means that if the delay line causes frequency f to be shifted by $\theta$, then the band pass filter must cause the same frequency to be phase shifted by $\theta$, $\theta + 2\pi$, . . . or $\theta + N\,2\,\pi$.

A phase equalizer is combined with the band pass filter to provide the necessary matching linear phase characteristic. Getting back to the additional reasons for selecting a constant amplitude response for the band pass filter, it happens that it is simpler to provide a linear phase shift for a constant amplitude band pass filter.

The comb filter provides the chrominance output at 33 and the luminance output at 36. Comb filters 17, 18 and 19 will provide outputs only at output 36. That is because in those comb filters the signal on line 33 represents the unwanted sampling energy. It will be appreciated that in all cases only the band which has the interleaved energy, whether it be chrominance energy interleaved with luminance or sampling energy interleaved with desired signal, is combed by the comb filter, and that the low frequency portion of the comb filter output has been left unaffected by any combing action.

Figure 7:
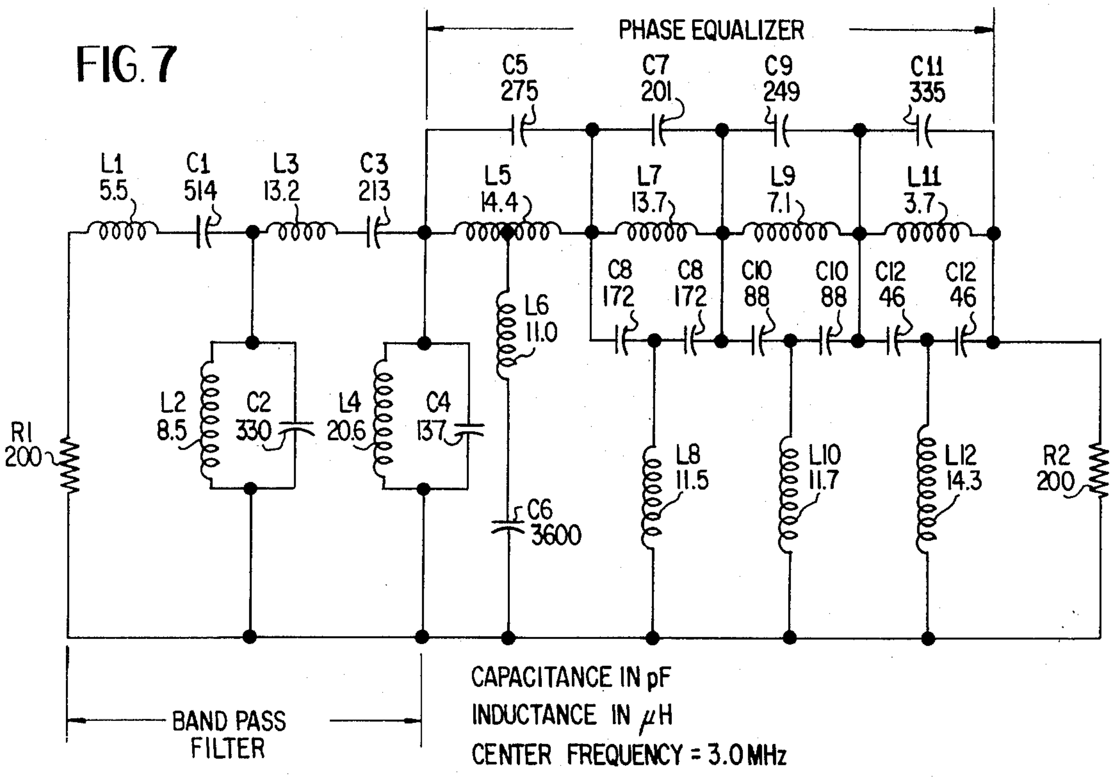
FIG. 7 is a schematic diagram of a band-pass filter and phase equalizer used in the comb filters of the present invention.

Referring to FIG. 7, there is shown a schematic diagram of a band pass filter and phase equalizer 32 used in the comb filter 17 for the Y channel as shown in FIG. 4. In order to insure proper combing action the band pass filter should be phase corrected so that the delay time through the band pass filter can be compensated by the BP delay line. To do this the phase equalizer is unique in that it (1) provides for a linear phase response throughout the entire band pass region, (2) provides for an amplitude difference which should not exceed 3 db between the signals at the input to amplifier 34 through the entire band pass region, and (3) provides for a phase difference which should not exceed $360° \pm 2°$ between these signals through the entire band pass region. It will be noted that due to the sampling frequency selected for the Y channel, the sampling energy will be folded back beginning at a frequency slightly below 2 MHz. Therefore, in this specific embodiment the band pass center frequency for comb filter 17 will be 3.0 MHz whereas the band pass center frequency for comb filter 1 will be 3.58 MHz.

The values of the band pass filter and phase equalizer 32 for comb filters 1, 18 and 19 may be obtained by scaling the values shown in FIG. 7. For comb filter 1, wherein the band pass center frequency would be 3.58 MHz, the inductances L would be scaled by 3.0/3.58 and the capacitances C would be scaled by 3.58/3. For comb filter 18 wherein the band pass center frequency would be 1.0 MHz the L's would be scaled by 3.0/1.0 and the C's by 1.0/3.0. For comb filter 19 wherein the band pass center frequency would be 0.33 MHz, the L's would be scaled by 3.0/0.33 and the C's by 0.33/3.0.

Figure 8:
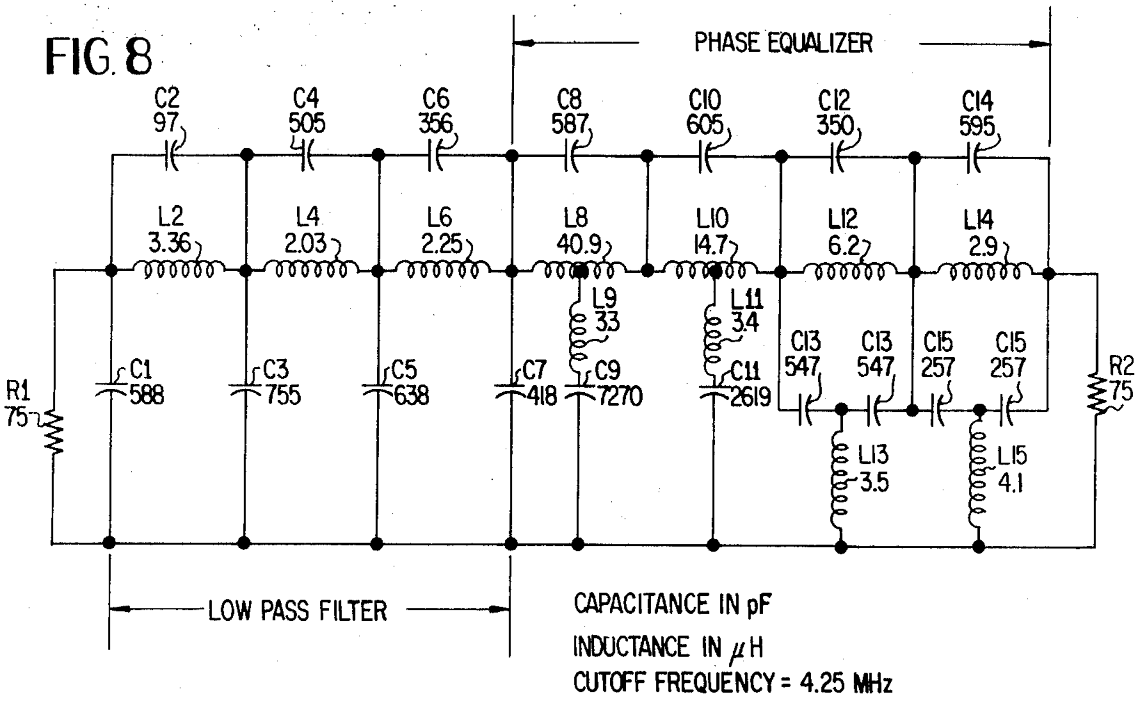
FIG. 8 is a schematic diagram of a low pass filter and phase equalizer.

Referring to FIG. 8, there is shown a schematic diagram of a low pass filter and phase equalizer used for the Y channel. The cutoff frequencies for the I and Q channels would be ~1.5 and 0.5 MHz, respectively. Therefore, the values of the L's and C's for the I and Q channels may be obtained by scaling the disclosed values in a manner previously discussed with respect to the band pass filter and phase equalizer.

There are several other features shown in FIGS. 3 and 4 which are important to the success of the reduced rate sampling technique as applied to the NTSC composite color television signals. First, the sampling clock 6 used to operate the samplers 7, 13, 14 is phase locked to the line synchronization signal using a digital phase lock loop circuit. Second, the sampling rate used for the Y, I and Q signals should be exactly equal to an odd multiple of one half the line frequency as already discussed.

Referring to sampling clock 6, the normal period for a TV raster to scan one line is 63.555 microseconds, i.e., a horizontal line frequency of 15.73 KHz. Locking the sampling clock 6 to the line synchronization signal (which is transmitted with each line of information) will insure that the sampling operations will occur at proper times in the event the scan period of the raster should vary from the normal period. This insures that the interleaved sampling energy will always be concentrated between two adjacent line harmonics of the original signal.

Figure 9:
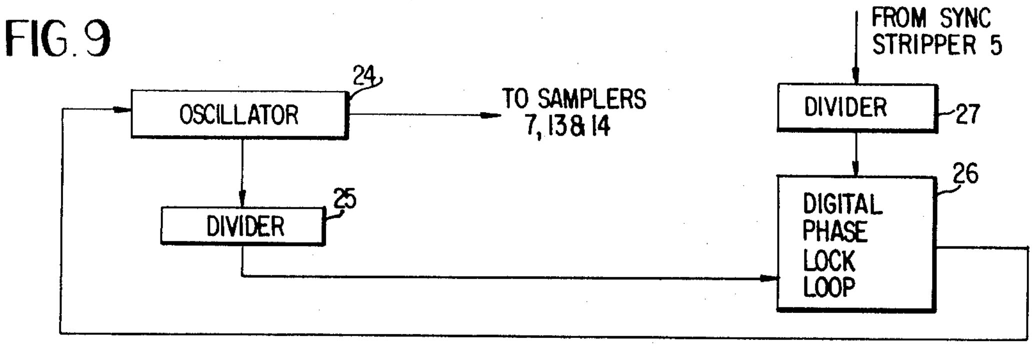
FIG. 9 is a block diagram of a sampling clock used for sampling a color TV signal.
Figure 10:
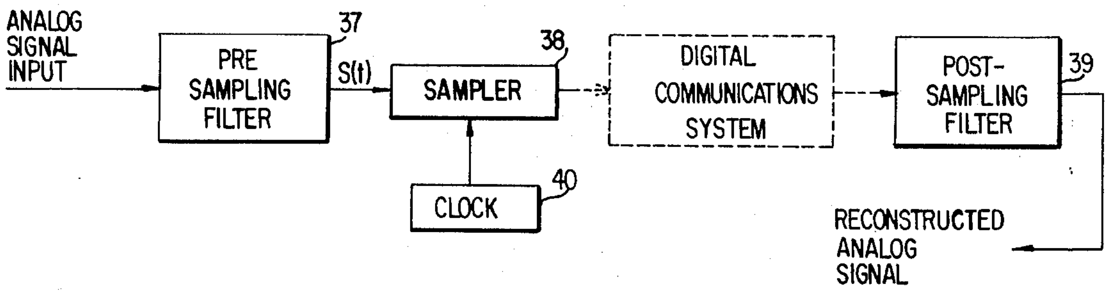
FIG. 10 is a general block diagram of a PCM sampling system.

Referring to FIG. 9, there is illustrated a block diagram of the sampling clock 6. The sampling clock 6 includes an oscillator 24 which oscillates at a frequency of 6.002 MHz. One output of oscillator 24 is fed to divider 25 which divides the output by an odd multiple of one half the line frequency to provide an output of 7.86 KHz. This output is then fed as one input to a digital phase lock loop 26 well known in the art. Synchronization information from synchronization stripper 5 is obtained to provide a signal at the horizontal line frequency of 15.73 KHz. This signal is then fed to a divider 27 which divides the line frequency in half to provide an output of 7.86 KHz which is the second input to digital phase lock loop 26. In a manner well known in the art, digital phase lock loop 26 compares the phase difference between the first and second inputs and produces an error signal proportional to the phase difference between the two inputs. The error signal is then fed to oscillator 24 which adjusts the phase of oscillator 24 to be in phase with the sync signal. In this manner, sampling clock 6 provides pulses to samplers 7, 13, 14 which are in the proper phase relationship with respect to the luminance and chrominance signals. Actually the output of oscillator 24 to samplers 13, 14 is fed to two dividers which respectively divide the output to provide the proper sampling rates for the I and Q signals.

With the reduced rate sampling system of the present invention, the effective bandwidth needed to transmit a video picture is reduced over conventional PCM systems. For example, in one conventional system if the NTSC signal is demultiplexed into its Y, I, Q components prior to transmission then sampling at the Nyquist rate would require sampling respectively at 8.4, 3.0 and 1 megasamples per second or a total of 12.4 megasamples per second. With the present invention the sampling rate would be, respectively, 6.002, 2.556 and 0.747 megasamples per second for the Y, I, Q signals or a total of 9.305 megasamples per second.

If the NTSC color composite signal is to be samples directly, the conventional manner is to sample the signal at a rate of 10 megasamples per second which is not much higher than the sampling rate of the present invention. However, for proper reconstruction of the signal, the samples should be quantized into 8 bits thereby producing a bandwidth of 80 megabits/second. With the system of the present invention, proper reconstruction of the sampled signal requires only that the Y signal be quantized into 4 bits and the I and Q signals be quantized into 2 bits, respectively. The use of only 4 bits for the Y signal and 2 bits for the I, Q signal is possible by employing differential pulse code modulation (DPCM) techniques of a type shown in application Ser. No. 38,951 entitled "Digital Differential Pulse Code Modulation System" by Gabbard et al. The total bandwidth needed to transmit the video signal is then equal to only 6·002 (4) + 2·556 (2) + · 747 (2) = 30.614 megabits/sample.

There are several observations which should be made concerning the reduced rate sampling system of the present invention. First, as will be noted from FIG. 2A, through the chrominance information is interleaved with the luminance information in the luminance gaps, i.e., at odd multiples of one half the line frequency, the chrominance and luminance information is degraded at the valleys of the luminance signal where the two signals overlap. Since the NTSC color composite signal contains this inherent degradation then with the technique of this invention, whereby the chrominance information existing in the gaps is replaced by sampling energy which also degrades the luminance signal at the valleys, there is no additional degradation of the luminance signal. For this reason, $A_1$ is chosen to be ~2 MHz. If $A_1$ ~2 MHZ, then sampling energy would be introduced in the valleys of the luminance signal which were not destroyed by the chrominance information thereby effecting picture fidelity. Secondly, concerning the chrominance signal, there will be some additional degradation at the valleys due to the interleaving of sampling energy. However, with respect to the chrominance information, and as is well known in the art, the vertical resolution is considerably greater than twice that of the horizontal resolution. In terms of picture quality, it is desirable to have vertical resolution equal to the horizontal resolution. Since information pertaining to vertical resolution appears at the valleys of the chrominance spectrum, some degradation of the information contained in the valleys can be tolerated. However, it should be noted that the amount of degradation due to placing energy in the valleys of the luminance or chrominance information is small in terms of picture quality.

What is claimed is:

1. A TV communications system for digitizing and communicating an analog TV composite signal comprising:

a. transmitter comb filter means responsive to a composite TV signal having modulated chrominance components interleaved with luminance components for separating said modulated chrominance from said luminance, said comb filter comprising;

i. first means for combing over the entire band of said composite signal for extracting said modulated chrominance components from said composite signal;

ii. band pass filter means responsive to said extracted modulated chrominance signal for blocking all signals below a certain frequency and for passing said modulated chrominance, said certain frequency being the frequency just below the lowest sideband of said modulated chrominance; and iii. means for subtracting said band passed chrominance from said composite signal to obtain a luminance signal which is uncombed up to said certain frequency and which has the modulated chrominance combed therefrom;

b. means for pulse amplitude sampling said latter luminance at a sampling rate $f_y$, where $f_y - W_y$ is substantially equal to or less than the said certain frequency and is an odd multiple of half the TV horizontal line rate and is less than 2 $W_y$, and $w_y$ the upper frequency of the luminance signal bandwidth; and c. means for converting each sample pulse amplitude into a digital quantity.

2. A system as claimed in claim 1, further comprising, a. means for reconverting said digital quantities into an analog signal, said analog signal representing said luminance component with sampling energy interleaved down to a frequency of $f_y - W_y$, b. a luminance channel comb filter means responsive to said last-mentioned analog signal for combing said sampling energy out of said analog signal, said comb filter means comprising, i. first means for combing over the entire band of said analog signal for extracting the sampling energy, ii. band pass filter means responsive to said extracted sampling energy for blocking all frequencies up to $f_y - W_y$ and for passing all frequencies between $f_y - W_y$ and $W_y$ of said extracted signal, and iii. means for subtracting said band passed sampling energy from said analog signal to obtain a luminance signal which is uncombed below $f_y - W_y$ and which has the interleaved sampling energy combed therefrom.

3. A system as claimed in claim 1, wherein said band pass filter of said transmitter comb filter has an amplitude characteristic which is substantially zero up to said certain frequency and which rises rapidly to a fixed amplitude at said certain frequency and remains substantially constant within 3 db of said fixed amplitude from said certain frequency to $W_y$.

4. A system as claimed in claim 1, wherein said band pass filter of said transmitter comb filter includes a phase equalizer for providing said band pass filter with a linear phase shift characteristic that matches the linear phase shift characteristic of a conventional delay line.

5. A system as claimed in claim 4, wherein said means for subtracting comprises means for delaying said uncombed composite signal an amount which equals the inherent delay caused by said band pass filter.

6. A system as claimed in claim 5, wherein said first means of said transmitter comb filter comprises, a. means for delaying said composite signal an amount equal to twice the horizontal line period of said composite signal, b. means for delaying said composite signal an amount equal to the horizontal line period of said composite signal, c. means for adding the signal delayed by two horizontal line periods with the composite signal undelayed to form a sum signal, and d. means for subtracting said sum signal from the composite signal delayed by one horizontal line period.

7. A TV communications system for digitizing and communicating a TV signal having at least a luminance component, comprising, means for sampling said luminance component at a frequency $f_y$ which is less than 2 $W_y$, where $f_y$ is an odd multiple of half the horizontal line rate of the TV signal and where $W_y$ is the upper frequency of said luminance component, means for digitizing said samples, means for reconverting said digitized samples into an analog signal representing said luminance component with sampling energy being interleaved at odd multiples of the horizontal line frequency down to $f_y - W_y$, and luminance channel comb filter means having a pass band from zero to $f_y - W_y$ and alternate pass and stop bands from $f_y - W_y$ to $W_y$, said pass bands centered at the harmonics of the horizontal line frequency and said stop bands centered at odd multiples of half the horizontal line frequency, wherein said luminance channel comb filter comprises, a. first means for combing over the entire band $W_y$ of said analog signal, said first means having a transfer characteristic with alternate stop and pass bands, said pass bands being centered at frequencies equal to odd multiples of half the horizontal line rate of said TV signal, and said stop bands being centered at frequencies which are the harmonics of said horizontal line frequency, b. band phase filter and phase equalizing means for passing a portion of the output of said first means, said filter and equalizer having a phase shift transfer characteristic which is linear and which matches a conventional delay line and having an amplitude transfer characteristic which is substantially zero up to $f_y - W_y$ and is substantially constant from $f_y - W_y$ up to $W_y$, c. means for delaying the uncombed analog signal an amount equal to the inherent delay of said band pass filter and phase equalizer, and d. subtraction means for subtracting the output of said band pass filter and phase equalizer from the output of said delaying means.

8. A system as claimed in claim 7, wherein said TV signal also comprises chrominance components I and Q having respective bandwidths $W_i$ and $W_q$, said system further comprising;

a. means for sampling said chrominance component I at a frequency $f_i$ where $f_i$ is less than 2 $W_i$ and is an odd multiple of half the horizontal line rate of said TV signal, b. means for digitizing said samples of said I component, c. means for reconverting said last mentioned digitized sampler into an I component analog signal representing said I component with sampling energy being interleaved at odd multiples of the horizontal line frequency down to $f_i - W_i$, and d. I channel comb filter means having a pass band from zero to $f_i - W_i$ and alternate pass and stop bands from $f_i - W_i$ to $W_i$, said pass bands being centered at the harmonics of said horizontal line frequency and said stop bands being centered at odd multiples of half the horizontal line frequency, e. means for sampling said chrominance component Q at a frequency $f_q$ where $f_q$ is less than 2 $W_q$ and is an odd multiple of half the horizontal line rate of said TV signal, f. means for digitizing said sampler of said Q component, g. means for reconverting said last mentioned digitized sampler into a Q component analog signal representing said Q component with sampling energy being interleaved at odd multiples of the horizontal line frequency down to $f_q - W_q$, and h. Q channel comb filter means having a pass band from zero to $f_q - W_q$ and alternate pass and stop bands from $f_q - W_q$ to $W_q$, said pass bands being centered at the harmonics of said horizontal line frequency and said stop bands being centered at odd multiples of half the horizontal line frequency.

9. A system as claimed in claim 8, wherein said I channel and Q channel comb filters are the same as said luminance channel comb filter with the exception that, a. the respective first means comb over the bands $W_i$ and $W_q$, respectively, and b. the respective band pass filters and phase equalizers have zero amplitude transfer characteristics up to $f_i - W_i$ and $f_q - W_q$, respectively, and have stop and pass bands from $f_i - W_i$ to $W_i$ and from $f_q - W_q$ to $W_q$, respectively.

* * * * *

UNITED STATES PATENT OFFICE

CERTIFICATE OF CORRECTION

PATENT NO. : 3,858,240

DATED : December 31, 1974

INVENTOR(S) : LEONARD S. GOLDING ET AL

It is certified that error appears in the above-identified patent and that said Letters Patent are hereby corrected as shown below:

IN THE SPECIFICATION:

Column 4 - Line 45, delete "$a_1$" and insert --$a_i$)-- (first and second occurrences)

Line 62, delete "liminance" and insert --luminance--

Column 6 - Line 33, after "causes" and before 'the signal band" insert --some signal degradation, it is desirable to select $f_S$ so that the lower part of--

Line 64, delete "terminal" and insert --subtracting amplifier--

Line 66, delete "Y(t)" and insert --y(t)--

Line 66, after 'yields" delete "." and insert --,--

Column 7 - Line 30, delete "leastt" and insert --least--

Column 10 - Line 4, delete "samples" and insert --sampled--

Line 26, delete "through" and insert --though--

IN THE CLAIMS:

Column 11 - Line 20, delete "$w_y$" and insert --$W_y$ is --

Signed and Sealed this

*sixteenth* Day of *September 1975*

[SEAL]

*Attest:*

RUTH C. MASON
*Attesting Officer*

C. MARSHALL DANN
*Commissioner of Patents and Trademarks*